June 29, 1965
T. W. BATTERMAN ETAL
3,192,458
HIGH SPEED AUTOMATIC SHUTTER MECHANISM AND CONTROL
Original Filed Sept. 30, 1958
7 Sheets-Sheet 1
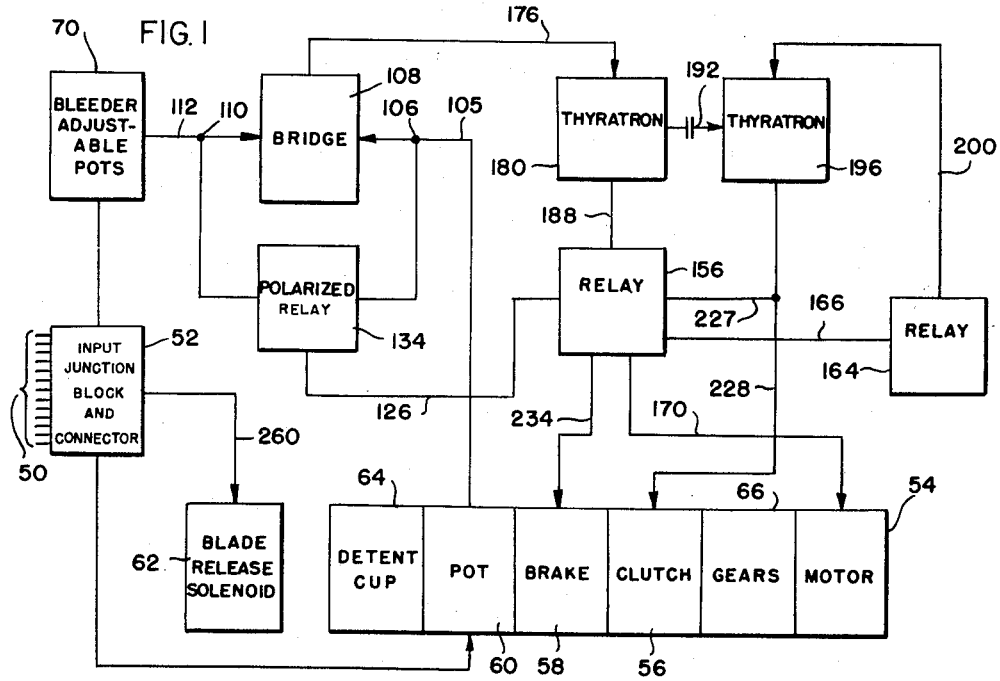
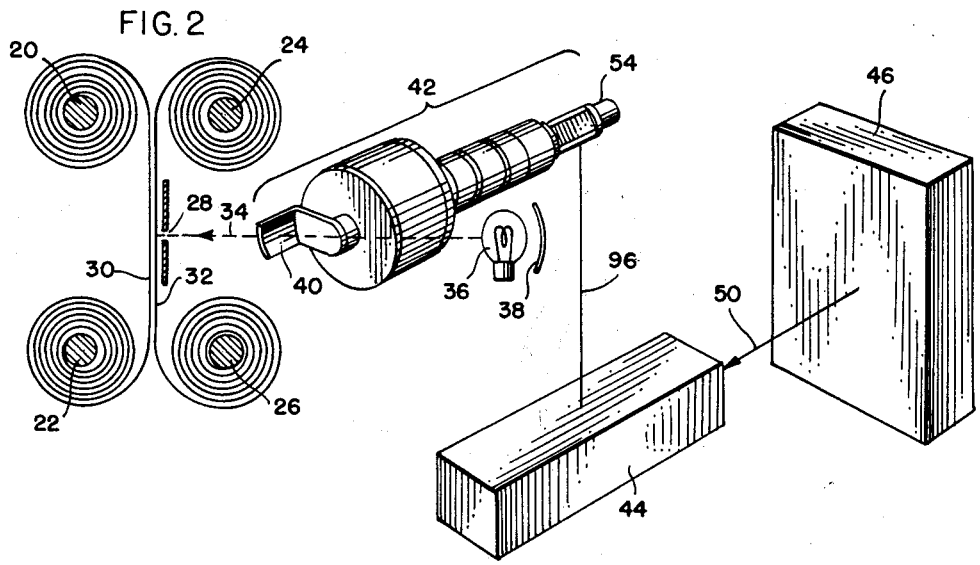
INVENTORS:
THEODORE W. BATTERMAN
MATHEW POBOG
BY Silverman, Mullin & Cass
ATT'YS

INVENTORS:
THEODORE W. BATTERMAN
MATHEW POBOG
BY
ATT'YS

June 29, 1965  T. W. BATTERMAN ETAL  3,192,458
HIGH SPEED AUTOMATIC SHUTTER MECHANISM AND CONTROL
Original Filed Sept. 30, 1958  7 Sheets-Sheet 3
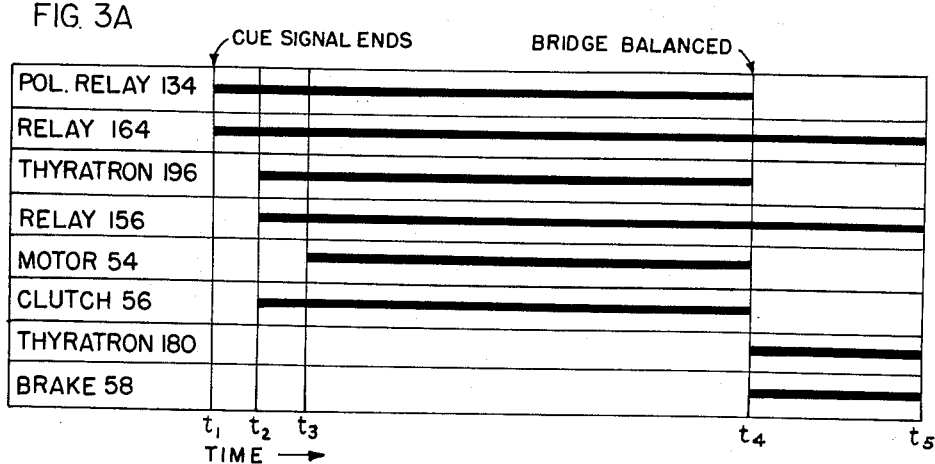
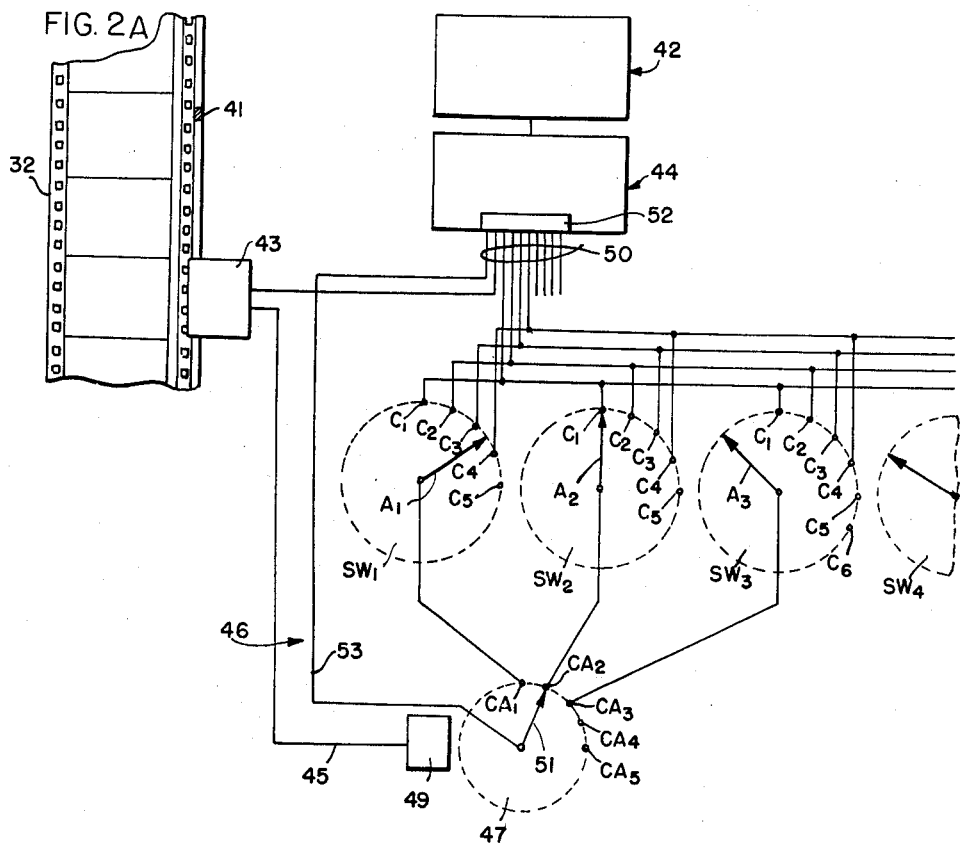
INVENTORS:
THEODORE W. BATTERMAN
MATHEW POBOG
BY Silverman, Mullin & Cass
ATT'YS June 29, 1965  T. W. BATTERMAN ETAL  3,192,458
HIGH SPEED AUTOMATIC SHUTTER MECHANISM AND CONTROL
Original Filed Sept. 30, 1958  7 Sheets-Sheet 4
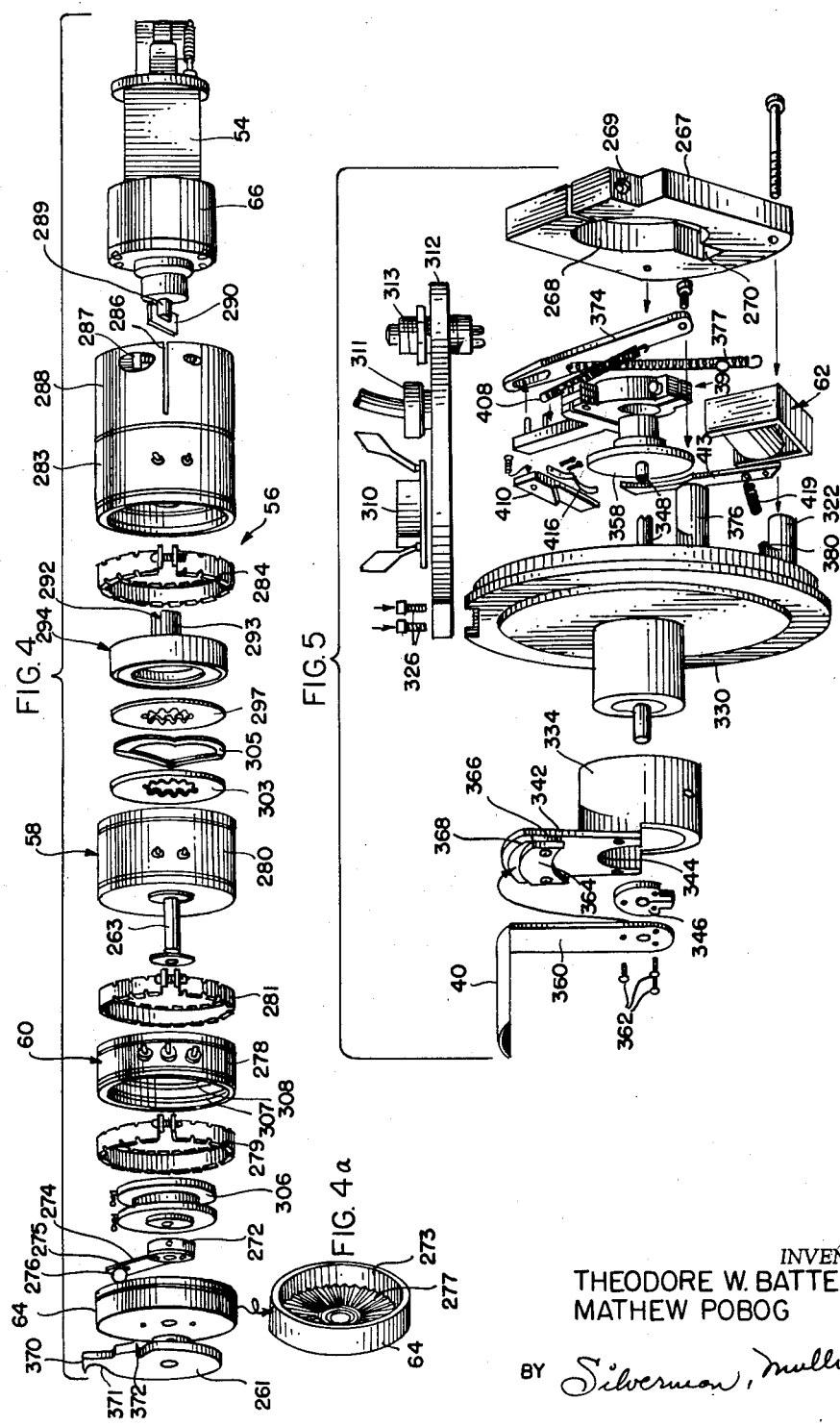
INVENTORS:
THEODORE W. BATTERMAN
MATHEW POBOG
BY Silverman, Mullin & Cass
ATT'YS

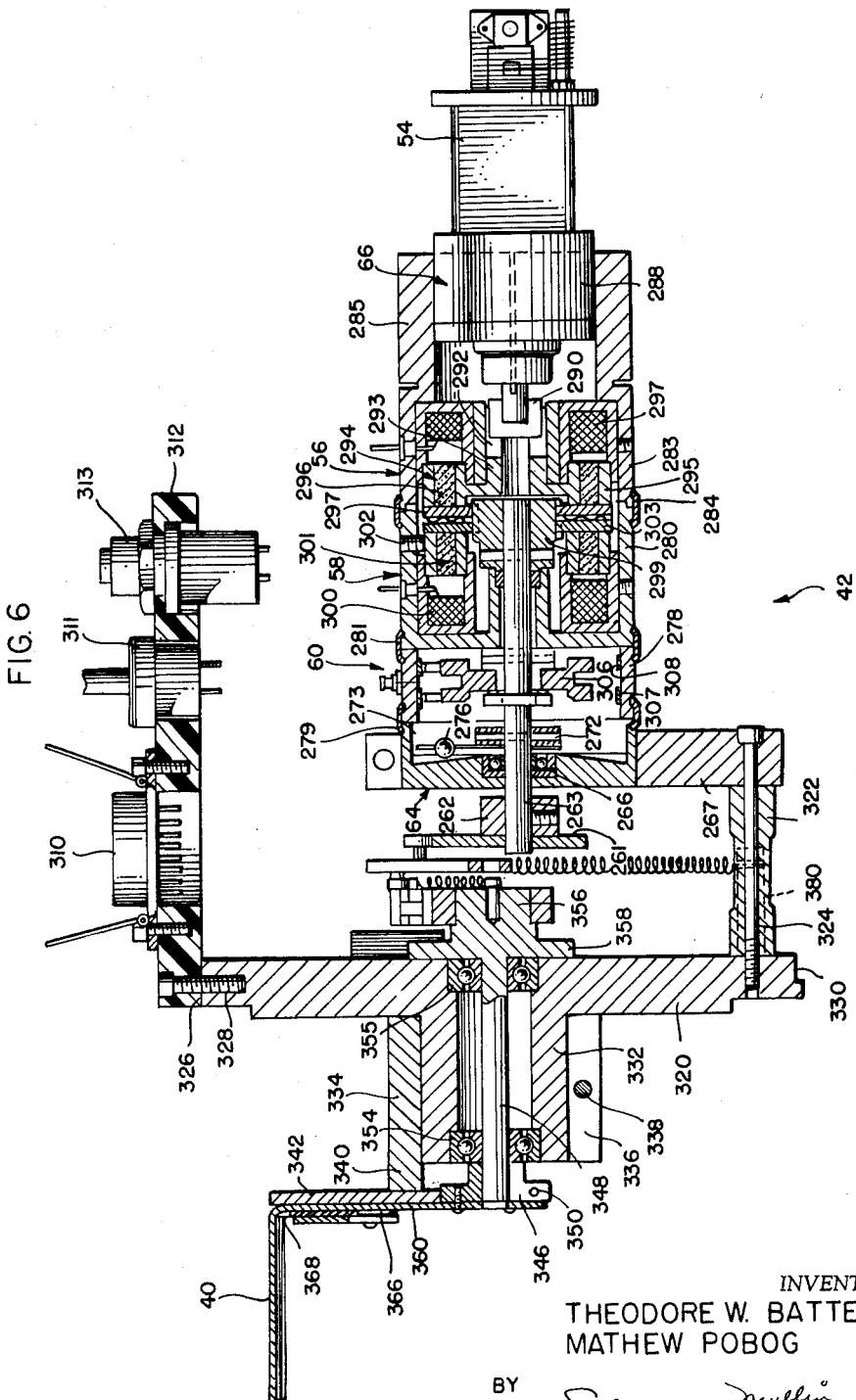

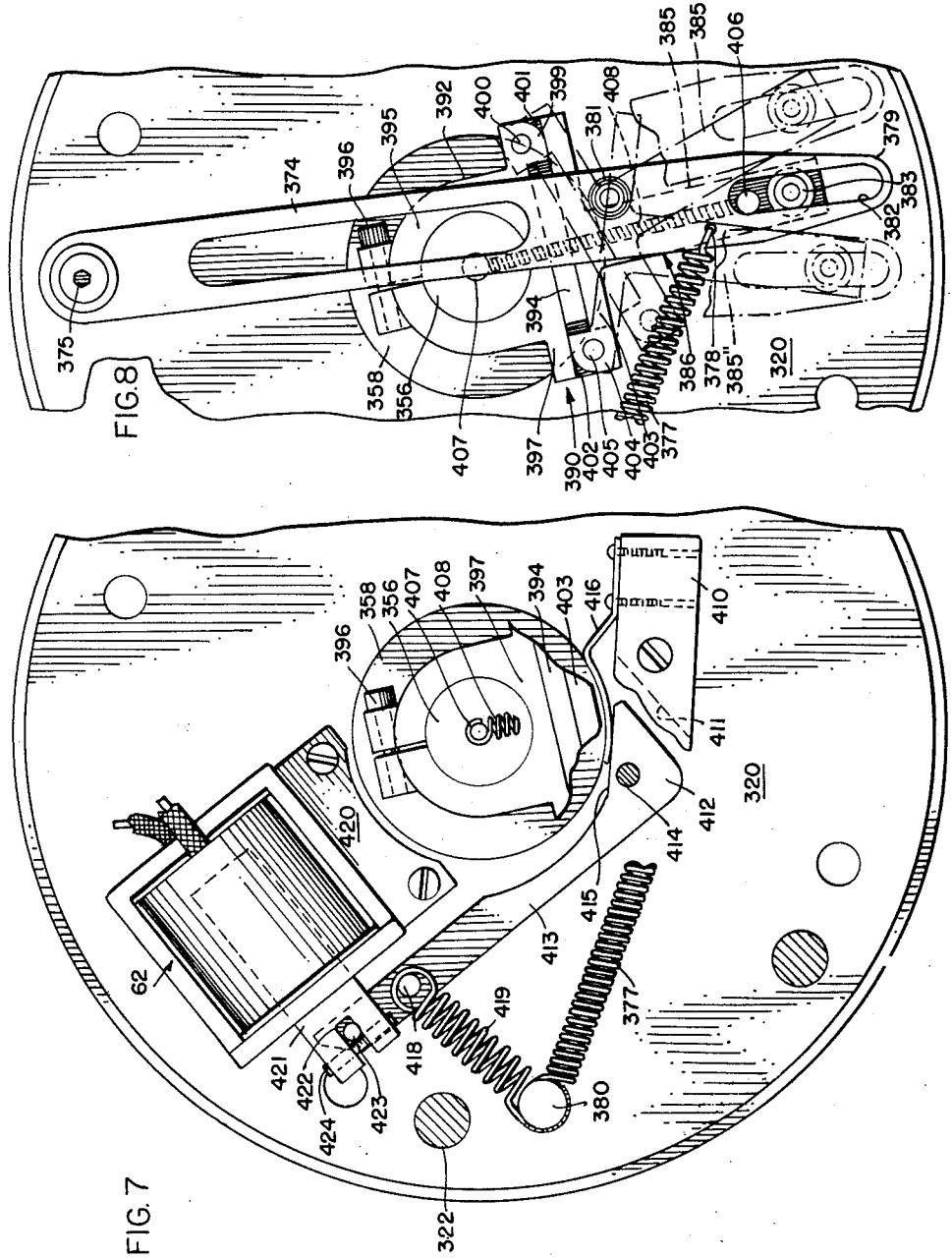

June 29, 1965 T. W. BATTERMAN ETAL 3,192,458
HIGH SPEED AUTOMATIC SHUTTER MECHANISM AND CONTROL
Original Filed Sept. 30, 1958 7 Sheets-Sheet 7

INVENTORS:
THEODORE W. BATTERMAN
MATHEW POBOG
BY
ATT'YS

United States Patent Office 3,192,458
Patented June 29, 1965

3,192,458
HIGH SPEED AUTOMATIC SHUTTER
MECHANISM AND CONTROL
Theodore W. Batterman and Mathew Pobog, Danville,
Ill., assignors to Electric Eye Equipment Company,
Danville, Ill., a corporation of Delaware
Original application Sept. 30, 1958, Ser. No. 764,331.
Divided and this application Sept. 23, 1960, Ser. No.
57,985
11 Claims. (Cl. 318—28)

This invention relates in general to setting arrangements for motion-picture printer shutters and the like such as disclosed in application No. 764,331, filed September 30, 1958, now Patent No. 3,046,864 of which this application is a division, and more particularly is concerned with a high speed automatic presetting mechanism and means for operating the same.

Motion picture film as used for display, that is, as finally produced for projection is considerably different from the film which is obtained by photographing scenes and developing the film. Disregarding the editing of the film which involves the insertion of titles and other easily photographed portions and which involves excision and splicing of the film, one of the most important considerations of providing a final product is the scene lighting. The film which is produced by direct photography of scenes is rarely exposed under optimum lighting conditions. In addition, many copies are usually needed. The master film, as the original is called, is thus required to be reproduced to provide copies, but in addition, in reproducing the same the undesirable lighting conditions must be compensated for so that the final product provides the exact lighting conditions that the editor believes are necessary for proper projection of the copy.

In the art of motion picture printing, copies of a master film are usually made by contact printing the master upon sensitized film, passing the engaged master and copy before a beam of light of predetermined intensity to expose the sensitized film, after which the copy is developed. The quality of the print is controlled to a large extent by controlling the intensity of the light beam to compensate for the undesirable conditions of lighting of the master film. Such control is essential for satisfactory film to be produced for proper projection.

It has become customary in the industry to produce the film in the following manner: After the complete master has been put together, the editor views the same carefully, scene by scene, and, using his best judgment, determines for each scene the best lighting conditions for printing the same. These conditions are tabulated in any manner and the master film is marked with identification means at each scene comprising a cue to enable the printer operator to identify the scene and apply the lighting prescribed therefor. The scenes and their lighting conditions are identified on the tabulation by the editor.

The intensity of lighting for the motion picture printing industry has been to a great extent standardized in the United States, each degree of intensity being represented by a number, and there being twenty-two degrees of light numbered 1 to 22 inclusive, with the intensity increasing with the value of the number. Zero represents a complete absence of light, and the number 22 represents full intensity. Thus, in addition to the different types of fade (which will not be discussed in this specification), there are twenty-three variations of intensity of the beam of light to which the master and printed film are adapted to be exposed during printing operations. Such variations may be specified in any unrelated order from scene to scene, and it is required of whatever means is used to print the motion picture film that it be capable of making the necessary changes between scenes while the film traverses the beam of light.

The cues on the master film may take a variety of different forms, any of which is suitable for use with the invention herein. Notches or perforations may open or close switches mechanically to give electrical cuing signals, or the particular scene may be identified by affixing a small bit of metal foil along the film edge and arranging the film to pass a pair of contacts normally open which will momentarily be closed as the foil member passes to provide an electrical signal due to the closing of the circuit by the foil.

Signals obtained from the cuing means have in the past been used to warn or notify an operator when to change the lighting conditions of the approaching scene. Many different apparatuses have been used for printing film, but in practically all cases, the film passes a fine iris at a continuous speed, and a beam of light is directed upon the iris through the use of any suitable optical system. Variation in light intensity is obtained through the use of an arcuate shield or blade, hereinafter called shutter or shutter blade, which is swung to intercept more or less of the beam of light. The said apparatuses have in the past had manually operable linkages to change the position of the shutter blade. The operator thus watches for the scene cues and consults the tabulation or chart he has for the lighting intensity. When he receives the signal, he will change a dial or move a lever or do some similar act which will be transmitted into shutter motion.

Present demands of those who use motion picture film have caused these old methods of printing to be beset with many extremely disturbing disadvantages. Where a motion picture subject runs for an hour or more and scenes are lengthy so that the changes of lighting between scenes occurred at widely spaced apart intervals, there is not a great difficulty in making manual changes of the lighting intensity. The operator in the past had plenty of time between scenes to assure himself that the setting for the next scene was properly made without error. This presumes, however, that even for these situations, the speed of printing was not so great relative to the length of film and the number of scenes such that the operator would be pressed for time and hence liable to make errors.

The numbers and types of consumers of film have increased considerably beyond the cinema hall owner and with such increase, the demands and requirements of the motion picture film printing industry have increased all out of proportion. Television, education and industry cannot use films of several hours duration. Shortness of time involved has given rise to an unprecedented demand for short film subjects in which the scenes are likewise very short and must flash a quick and comprehensible message. The manually operated printer cannot keep pace with these demands. An operator can make light changes with manual equipment at film printing speeds of not greater than 60 feet per minute and even at this speed, where the scenes are less than a foot or more in length, it becomes almost a physical impossibility for an operator to accurately make the changes in several such adjacent scenes. Short flashes in today's motion picture films are not unusual where the length of film involved is one-half foot. The manually operated machine must be operated at a very slow speed in order to enable such changes to be made. At fast speeds errors and spoilage are a direct result of operator fatigue and inability to keep pace with the scene changes commanded by the master film. Since a great percentage of film used today is color film, the expense of spoilage is increased greatly.

The speed of printing film is a direct measure of the profits to be gained through the operation of the printer for reasons which are believed obvious. Slow speeds are inherent in manual printers, not because of the speed at which the film can be driven, but because of the limitations of human skill and dexterity, and in addition because of the slow time required for the shutter to respond, due to inertia of the heavy and complex mechanisms and linkages heretofore used in printers.

Speeds of 150 feet per minute are impossible in a printer which is operated manually, and yet such speeds are readily capable of being achieved in apparatus constructed in accordance with the invention, even where the scenes are successively one foot long and the light changes are over the complete range of zero to 22. Longer scenes and shorter changes enable substantial increase in the speed of printing, up to 350 feet per minute.

The difficulties and disadvantages which have heretofore beset this industry provide an example of the type of situation wherein the present invention is intended to function and therefore it is illustrated as controlling a shutter to provide completely automatic operation in a picture printing system.

The invention may be considered from several standpoints which provide the general objectives above mentioned. The invention contemplates the provision of a novel pre-setting mechanism which is here illustrated for pre-setting the position which a shutter blade will assume upon release and which is operated herein by suitable cam means; it contemplates a novel control circuit which operates in conjunction with a servo system to properly position the cam means; it contemplates a novel servo system arranged to operate with the control circuit and presetting mechanism; and it contemplates these structures in combination, not only with themselves but with other metans to provide a system or systems by means of which the advantages and most desirable features of the invention are achieved. Obviously, the combination of all of the structure to be described hereinafter and which is illustrated is believed at this time to give the best results, but even the use of portions of the system with other means will give rise o many benefits and advantages.

In connection with the systems above referred to, the shutter pre-setting mechanism and servo system may operate with a structure using a pre-perforated tape passing through a suitable reader and providing the control for positioning the cam means. This system would not necessarily use the control system specifically described herein. Reference may be had, if desired, to a co-pending application Serial No. 764,330, filed September 30, 1958 by the applicants herein, and assigned to the same assignee as this application, now Patent No. 2,923,354 granted February 2, 1960, entitled "Tape Perforator" for a discussion of this manner of control. The particular system which is described herein utilizes a programming board in conjunction with its control circuit and servo system in which the lighting conditions of consecutive scenes are manually set up in a plurality of multi-position switches and the cue signal in addition to initiating the operation of the entire system, causes the switches consecutively to be energized or connected into a circuit as the scenes progress, thereby completing the proper connections with the control circuit for achieving the desired error voltage necessary to drive the servo motor. The details of this programming board are shown and described in a co-pending application of the applicants herein, also assigned to the same assignee as this application, Serial No. 768,687, filed October 21, 1958 and entitled "Automatic Programming Control Board for Automatic Shutters" now Patent No. 2,917,640, granted December 15, 1959.

The programming board is not discussed at great length hereinafter, and hence, some comment thereon would be advisable at this point. The servo system of this invention is intended to rotate the cam means by a motor which also drives a potentiometer. A bridge compares the voltage across the potentiometer and the voltage across a bleeder to achieve an error signal for energizing the motor. The bleeder has a plurality of taps, each representing a condition of lighting, and the taps are connected to the same contact of each of the plurality of switches in the programming board. Thus, the number of contacts (all switches are the same) represents the different degrees of intensity, and the number of switches represents the number of scenes capable of being printed. The slider of each switch is consecutively connected to the control circuit so that its setting with respect to its contacts will direct which tap of the bleeder will be involved. The consecutive connection of the sliders is accomplished by the cue signals.

Many objects of the invention and features thereof can be set forth at length, but it is believed that these will become quite apparent to the one skilled in this art as he examines this specification, and in addition, others will occur to him. It is desired, however, to point out a few of the features of the invention and its several phases other than mentioned above which may serve as an aid to appreciation of the invention:

The invention enables greater accuracy in placing the shutter and greater repeatability of settings.

The invention saves considerable manpower.

The invention eliminates overshoot, errors, spoilage and the need for operator skill.

The invention is readily embodied in apparatus which is simple to manufacture and adjust; which is economical in initial cost and maintenance and operation; and which occupies very little space.

The complete system has been described in considerable detail hereinafter as embodied in a commercial device, to comply with the patent laws requiring a preferred example, and to further promote a complete understanding of the invention, and how the same is used. This is exemplary, however, since almost infinite variation of minor details is possible without departing from the spirit of the invention.

Conventional symbols and pictorial diagrams are used to explain the invention. While an attempt has been made to apply the reference characters in a systematic manner to avoid confusion, it must be pointed out that the numbers and letters of the terminals of the input and output plugs are not intended as reference characters, but merely to identify terminals thereof. Like characters of reference in several figures of the drawings are intended to designate the same or equivalent structures or means.

In said drawings:

FIG. 1 is a block diagram illustrating the control unit of the invention and showing the general connections to the motor assemblage.

FIG. 2 is a diagrammatic block diagram illustrating the system of the invention and showing the manner in which the system is used in connection with a motion picture film printer.

FIG. 2a is a diagrammatic view of the system used to explain the operation thereof.

FIG. 3a is a chart showing the programming of the operation of the various parts of the system.

FIG. 4 is an exploded perspective view of the motor assembly of the invention.

FIG. 5 is an exploded perspective view of the shutter operating mechanism driven by the motor assembly.

FIG. 6 is a median sectional view taken through the entire assemblage including the motor and its associated parts as well as the shutter operating mechanism.

FIG. 7 is an enlarged fragmentary elevational view of the brake mechanism to show the details thereof.

FIG. 8 is an enlarged fragmentary view of the pre-setting mechanism for operating the shutter.

Figure 3:
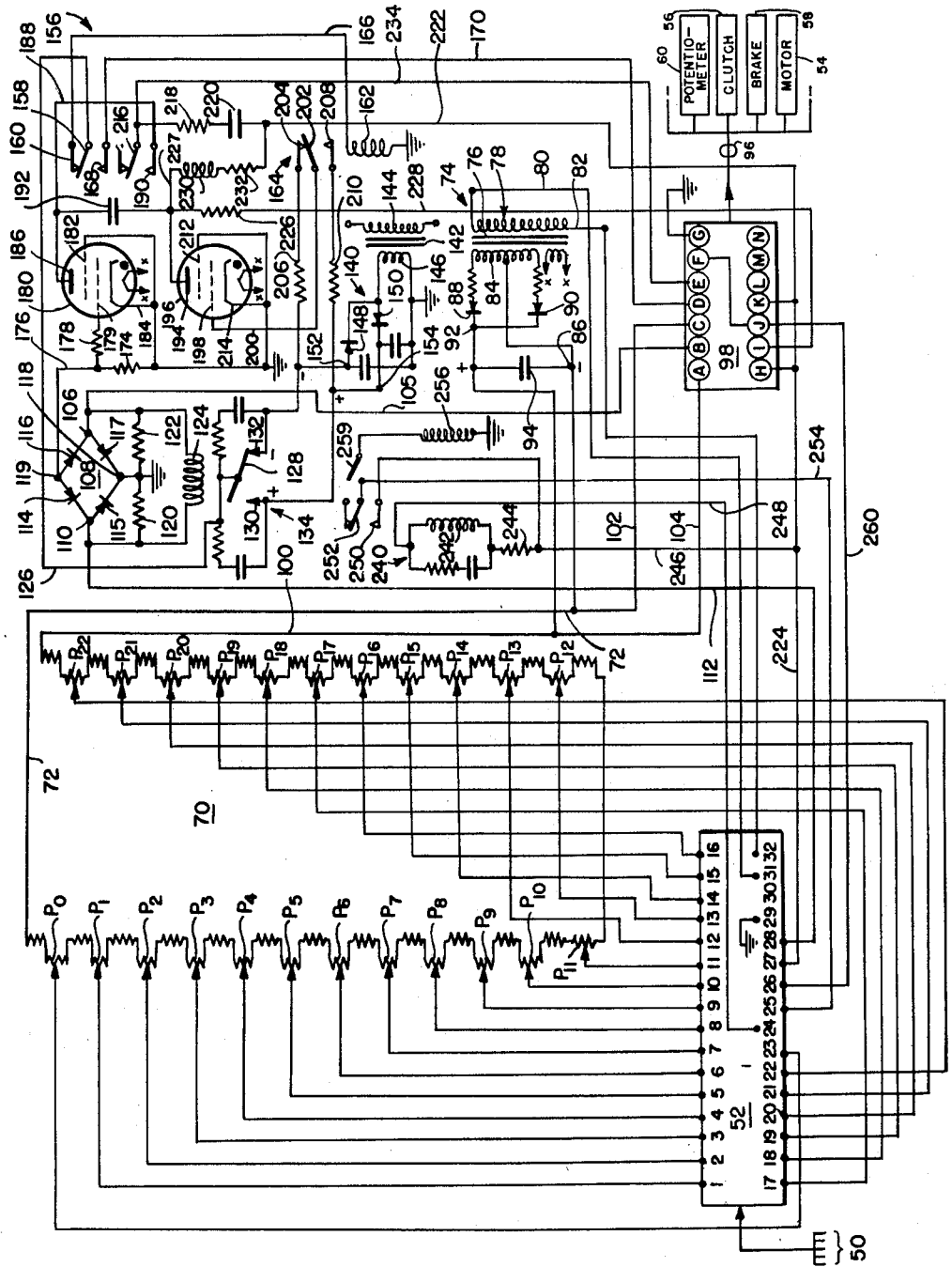
FIG. 3 is a complete circuit diagram of the control unit of the invention.

Attention is now invited to FIGS. 1, 2 and 3 in which the operation of the system is generally illustrated by means of block and circuit diagrams. The basic system is best discussed in connection with FIG. 2 which illustrates the manner in which the invention is practically applied to a system for printing motion picture film.

On the left hand side of FIG. 2 there are illustrated four reels, 20, 22, 24 and 26. The reels 20 and 24 are supply reels and the reels 22 and 26 are take-up reels. A length of sensitized motion picture film is mounted on the reel 20 and threaded past a suitable iris 28 and wound upon the take-up reel 22. That portion of the sensitized film which extends between reels 20 and 22 is designated 30 and it is in contact with a similar length of film 32, the length 32 being a portion of the master motion picture film which is wound on the reel 24 and also extends past the iris 28 to its take-up reel 26. The film lengths 30 and 32 are together driven past the iris in complete contact so that light directed through the iris, along the path 34 will photographically affect the sensitized film as it moves past the iris, printing thereon the image which appears on the master film.

Obviously the apparatus which supports the reels, drives them, and encloses the same in darkness, need not be shown since this may take many different forms. The light source is symbolically illustrated at 36, and suitable optical means are provided to concentrate the beam, including, for example, a parabolic reflector 38. The light beam 34 is intercepted by an arcuate shutter or diaphragm 40, the position of which will determine the amount of light which is directed upon the iris 28, and hence the amount of light that will impinge upon the contacted master film and sensitized film. This, therefore, provides a means for controlling the quality of the scene printed, to a certain extent independent of the lighting conditions under which the scene was originally photographed on the master film.

The technique described thus far in this specification is well known, and is in commercial use at the present time, there being certain standards of lighting conditions established and accepted by the industry for printing motion picture film. These standards are designated by the numbers 1 to 22, the light intensity increasing with the increased value of number. Zero designates complete absence of light, that is, the shutter completely cutting off the light.

Heretofore, the position of the shutter has been adjusted by suitable mechanical means changed manually by a skilled operator. The master film is provided along its edge with cuing marks or notches or pieces of foil located at the scenes where the light conditions are to be changed. These have been chosen both as to scene and as to intensity of light by a film editor, and tabulated. The operator follows the tabulation and makes the necessary shutter changes.

As previously mentioned, the operator's speed is limited, and film spoilage and errors in lighting are not unusual. The disadvantages of manual operation of the shutter are too well known to require discussion at length here. The invention is intended to eliminate the need for an operator, eliminating errors in judgment and execution, enabling the printing to proceed at a rapid rate and completely automatically.

The reference character 42 designates generally an automatic shutter assemblage with suitable parts which will shortly be explained, adapted to be operated by a control unit shown in block form at 44 which in turn is keyed or programmed by a suitable programming board designated generally 46. The board 46 is the subject matter of the co-pending application Serial No. 768,687, which has been mentioned above, and hence this application will make no detailed reference thereto. The control unit 44 and the programming board 46 may be replaced by other means which will provide the required signals to the shutter assemblage 42. For example, a perforated tape having the desired commands applied thereto in the form of groups of perforations in binary code may be passed through a suitable reader to provide the signals applied to the shutter assemblage 42.

The invention herein has several different aspects in addition to the provision of the shutter assemblage 42 and its mechanism. These include the construction of the control unit 44, combination of such a control unit with the shutter assemblage 42, and the combination of the shutter assemblage 42, control unit 44, and some means for programming the shutter positions.

FIG. 1 is a block diagram of the shutter assemblage 42 and the control unit 44; FIG. 2a is a system diagram; FIG. 3 is a circuit diagram of the control unit 44; hence the three figures should be consulted together in connection with the discussion thereof which follows immediately.

The programming board 46 is connected to the unit 44 by means of a cable 50 which, as shown, has approximately 32 conductors. The connection is made by means of one or more plugs, and it may be assumed for illustrative purposes there is one such plug which engages a suitable socket in the unit 44. This connection is hereinafter called an input plug and is designated 52. The output of the control unit is applied in various manners to the assemblage 42 to change the position of the shutter 40. The various parts of the assemblage 42 which are involved are the motor 54 which provides the motive power for physically driving the pre-set mechanism which changes the position of the shutter; the electrically operated clutch 56; the electrically operated brake 58; a balancing potentiometer 60; and a blade release solenoid 62. All of these last mentioned elements have parts which are mounted on the same shaft and driven by the motor 54, except for the blade release solenoid 62. The block diagrams include two other elements which are coaxial with the motor shaft and these comprise the detent cup 64 and the gear box 66 for reducing the speed of the motor. The detent cup 64 operates in conjunction with a ball that is driven by the motor shaft, but this will become more apparent with the detailed description of the assemblage 42.

We may now consider the general problems which the apparatus is required to solve and the functions which must be performed in order to solve such problems. The programming board 46 has been pre-set with certain information which relates to the desired dispositions of the shutter 40. At a given instant the shutter is required to assume a position represented by the command of the programming board, and maintain that position throughout the entire extent of the scene that passes thereafter. At the end of the scene and the beginning of the next, the shutter again must move to a new position as commanded by the programming board and maintain that position, and so on.

The shutter's position is adjusted by means of the motor 54 which is coupled to the shutter through various mechanisms. Obviously the motor must be driven to rotate for a finite length of time between settings of the shutter which may be angularly a substantial distance apart. In addition, if the motor were coupled directly to the shutter, the movement of the shutter would provide a continuous change of light upon the film as it passes, which is not acceptable because the effect might be similar to fade or gradual increase of light where a particular change is desired. Both of these difficulties are eliminated by pre-loading or pre-setting of the mechanism which changes the position of the shutter. The lighting conditions for one scene are pre-set in the shutter drive linkage while the previous scene is being printed. In practically all cases, the motor will have ceased rotating before said previous scene has been completed, and hence, when the command signal to change lighting conditions is received, a solenoid will substantially instantaneously release the shutter itself, to permit it to assume the pre-set condition, while the motor starts once more to begin pre-setting the position of the next scene. In other words, each command signal performs two functions: (a) it operates a solenoid to release the shutter to the condition already pre-set, and (b) it starts the motor and drives the shutter pre-setting mechanism to the proper position for the next command signal.

The sequence of these two occurrences is as stated above, and the system is constructed so that the motor is not energized until after the command signal has been completed. The command signal actually is derived from the cue which is applied to the master film in the form of the notch, perforation or foil shown diagrammatically at 41 in FIG. 2a.

The motor is required to rotate an amount needed properly to position the shutter pre-set mechanism. This amount of rotation is controlled by the information supplied by the program board, representing a setting of the shutter 40 to provide the light determined as proper by the editor for the particular scene. The motor is therefore required to receive an error signal, which must be polarized to drive the motor one way or the other from its former position to that which is to represent the proper condition of the pre-set mechanism. In order to do so, the motor also drives the slider of a balancing potentiometer and the voltage of the potentiometer is compared in a bridge with the voltage derived from the programming board 46. When perfect balance is obtained the motor stops rotating because the error signal becomes zero. The motor must be connected to the potentiometer and the cup detent, and must be stopped at precisely the instant that the desired condition is reached without overshoot, and hence there must be a sequence of clutching and braking operations which occur for each cycle of operation.

The sequence of operations is graphically illustrated in FIG. 3a.

The apparatus must also provide means for effecting the performance of various other functions, such as, for example, manually operating the device, starting and stopping the printer.

In FIG. 2a there is diagrammatically illustrated a system in which the programming of operations is achieved by means of a programming board like that of FIG. 2, designated 46, and specifically illustrated and described in said patent application Serial No. 768,687, above mentioned. The general structure and operation of the system will be described in connection with this figure.

The master film has a cue-signal means in the form of a foil member 41 or the like on an edge, and when the portion 32 of the master passes a suitable signal-producing device, such as an open electrical circuit or the like, designated 43 in FIG. 2a, the solenoid 62 is energized to instantaneously change the shutter to some position determined by the pre-positioning or pre-set mechanism of the assemblage 42. The signal is applied through one of the leads of the cable 50 to the control unit 44. Another signal is applied through the path designated generally 45 to a step-switch 47 operated by a solenoid 49 to move the arm 51 from one contact to the next. Thus, it will be appreciated that each time there is a cue signal, at the end of the cue signal, by virtue of the relaxation of a relay or the like, the step-switch 47 is moved one step.

The programming board has a plurality of manually adjustable rotary switches $SW_1$, $SW_2$, $SW_3$, etc., there being as many switches as scenes it is desired to provide the lighting for. Each switch has a plurality of contacts, which are designated $C_1$, $C_2$, $C_3$, etc., there being as many contacts as lighting degrees, for example 23, and there may be another contact for re-setting purposes, if desired. Only a few of these contacts are shown on each switch, and all of the identically positioned contacts are connected together and to a suitable terminal of the input plug 52 by a conductor of the cable 50. The arms $A_1$, $A_2$, $A_3$, etc. are each connected to one of the consecutive contacts $CA_1$, $CA_2$, $CA_3$, etc. of the step-switch 47. The conductor 53 is the return of the arm 51 to the control unit 44.

Each step of the switch arm 51 completes a circuit through a different one of the switches $SW_1$, $SW_2$, $SW_3$, etc. and since each switch arm $A_1$, $A_2$, $A_3$, etc. is adjustable to any one of a plurality of different positions on the contacts of that switch, the completed circuit will include only one of the conductors of the cable 50. The conductors leading from the contacts $C_1$, $C_2$, $C_3$, etc. of the switches $SW_1$, $SW_2$, $SW_3$, etc. each connect to a different tap of the bleeder 70 which is to be described hereinafter so that the voltage thereby picked off the bleeder 70 can be compared with the voltage of the potentiometer 60.

In this manner, an operator can position all of the arms of the switches $SW_1$, $SW_2$, $SW_3$, etc. in advance according to the editor's tabulation of the desired lighting for consecutive scenes, and turn on the equipment. As the master film passes the signal producing device 43, each time a cue 41 passes it will change the shutter to any previously set position and connect the next one of the switches $SW_1$, $SW_2$, $SW_3$, etc. into the circuit. While the scene is being printed with the setting of the previous lighting condition, the pre-set mechanism is being adjusted to the new lighting condition, and as soon as the next cue 41 comes along, the cycle will repeat. In this manner the entire motion picture film can be printed automatically. There are only physical limits to the number of switches that can be carried on the program board, and the same switches can be connected to be "scanned" by the step-switch 47 a second time for long films. After each cycle, which the step-switch 47 passing the connection to the following of the manually changeable rotary switches $SW_1$, $SW_2$, $SW_3$, etc., the particular switch can be manually changed again so that when the connection is made with it on the second round of the step-switch, there may be a new setting thereof. All of this is explained in said copending application.

The use of a pre-punched tape and reader will alleviate the need for the programming board 46 and control unit 44, but similar functions can be performed by both with the assemblage 42.

Referring now to FIG. 3, the input junction block and connector 52 of the control unit 44 connects said unit by the cable 50 with the programming board 46. The control unit 44 has a bleeder 70 which is formed of a plurality of adjustable potentiometers all connected in series and across a voltage source so that a particular voltage can be picked and compared with the voltage of the potentiometer 60. The bleeder 70 has twenty-three potentiometers which are designated $P_0$ to $P_{22}$ inclusive, and which are separated, if desired, by other resistors which are not designated by reference characters, the values and arrangements of potentiometers and resistors being such as to provide the desired error voltage to drive the motor when compared with voltages of the potentiometer 60. The sliders or wipers of the potentiometers are connected to twenty-three of the terminals of the input junction block and connector 52, the lead from the slider of the potentiometer $P_0$ being connected to terminal numbered 23, and the others being connected to the respective similarly numbered terminals, that is, $P_1$ to terminal 1, $P_2$ to terminal 2, and so on. Each of said terminals 1 to 23 is connected to all of the identically positioned contacts of all of the manually adjustable rotary switches $SW_1$, $SW_2$, $SW_3$, etc. so that the step-switch 47 serves to establish a connection with any pre-chosen tap $P_0$–$P_{22}$ upon each step of movement. The negative side of the bleeder 70 is connected by the lead 72 to the negative terminal of a power supply 74. The power supply 74 includes a transformer 76, the primary winding 78 of which is connected to leads 80 and 82 which extend respectively to the terminals 31 and 32 of the input plug 52. The cable 50 includes two leads supplying 115 volts A.C. power from a suitable source.

The center tap of the secondary winding 84 forms the negative terminal 86, and there is a resistor and rectifier 88 and 90 in each of the terminals of the secondary winding 84, the opposite terminals of the rectifiers 88 and 90 being connected together to form the positive terminal 92, a filter condenser 94 being connected across the terminals 86 and 92. A low voltage secondary winding supplies filament voltage for the two thyratrons of the circuit, which will be described.

The assemblage 42 comprising the motor 54 and related elements, is connected to the control circuit 44 by means of a cable 96 which has at least eleven conductors, the control unit 44 having a junction block and connector 98 providing the connection with said cable which will be termed the output junction block and connector. The terminals of the junction block and connector 98 lead to various of the parts of the assemblage 42.

The positive side of the bleeder 70 is connected to the positive terminal 92 of the power supply by the lead 100. The potentiometer 60 also has a negative side and a positive side, and these are also connected respectively to the negative and positive terminals 86 and 92 of the power supply 74 through the cable 96, terminals C and A and the leads 102 and 104. The center tap or slider of the potentiometer 60 terminates at terminal B and this terminal connects by the lead 105 with the right hand terminal 106 of the balancing, rectifying bridge 108. The opposite terminal 110 of the bridge 108 connects by the lead 112 to the terminal 28 of the input plug 52.

The terminal 28 extends to the common conductor 53 in the programming board 46 for all of the wipers or sliders of the potentiometers $P_0$ to $P_{22}$ so that the voltages which are picked off the bleeder 70 and the potentiometer 60 are compared at opposite terminals 106, 110 of the bridge 108. If the potentials are identical, there will be a balanced condition of potentials applied to these opposite terminals of the bridge 108, but if the potentials are different, current will flow in the bridge. It will be noted that the bridge has four rectifiers 114, 115, 116, and 117 and that all of the rectifiers are arranged so that no current can flow from the terminal 118, which is ground, to the terminal 119. There are two additional elements comprising resistors 120 and 122 which are in parallel respectively with the rectifiers 115 and 117. The condition of applied potential balance is primarily detected by the solenoid 124 which is connected across the terminals 106 and 110. As seen above, the "balance" condition associated with bridge 108 refers, in the context of the invention, to an equality of potentials applied to the opposite terminals 106, 110. For conciseness of expression herein, the term "balance" and "unbalance" as applied to the bridge 108 will be understood to comprehend, not a physical balance of impedances among the several bridge arms, nor yet a physical balance of the mass of the bridge, but the balance of the potentials applied to a pair of opposite bridge terminals, as terminals 106, 110. Current will flow one way or the other in the solenoid winding and will thus close a circuit from the lead 126 through the relay arm 128 to either the contact 130 or the contact 132. This structure is referred to generally as a polarized relay and given the reference character 134.

As previously pointed out, since current can only flow in the bridge from the terminal 119 to ground, in addition to the unbalancing of the bridge causing the polarized relay to be thrown one way or the other, the unbalancing of the bridge 108 will also cause a negative potential to appear at the terminal 119.

The terminals 130 and 132 are maintained at positive and negative potentials respectively by a power supply 140 which comprises a transformer 142 whose primary winding 144 is connected across a suitable A.C. supply, the secondary winding 146 having one terminal connected to ground and the other through two reversed polarity rectifiers 148 and 150 to provide negative and positive terminals 152 and 154 respectively. The condensers connected to ground are for filtering ripple.

Tracing the conductor 126 to the relay 156, the lead connects with the center arm 158 which is normally on the contact 160 connecting the lead 126 to the solenoid 162 of relay 164 to ground through conductor 166. When the relay 156 is energized in a manner presently to be described, the arm 158 will move off the contact 160 and on to the contact 168 thereby connecting the lead 126 to the lead 170, which extends to the terminal D of the output plug 98. This terminal connects directly with the electric motor 54 and depending upon the position of the polarized relay 134, energizes the motor to run forward or backward. The motor windings obviously are connected to ground at their opposite terminals.

The polarized relay 134 will be in a neutral position when the bridge 108 is balanced and under these circumstances no voltage can be applied to the motor 54.

Considering the condition of unbalance, when this occurs, as when the voltages tapped off the bleeder 70 and the potentiometer 60 are different, the negative potential on the terminal 119 will cause a potential across the grid resistor 174 in lead 176 and will be applied through the resistor 178 to the grid 179 of the grid-controlled gaseous tube 180. The thyratron 180 has its second grid 182 grounded to its cathode 184 and its plate 186 connected by lead 188 to the contact 190 of the lower group of contacts of the relay 156. The plate 186 is also coupled through a condenser 192 to the plate 194 of a second thyratron 196. The first grid 198 of the thyratron 196 is connected by the lead 200 to the arm 202 of the relay 164 and this arm is normally in engagement with the contact 204 which connects through a resistor 206 of the negative terminal 152 of the power supply 140.

The other contact 208 of the relay 164 connects to the positive terminal 154 through resistor 210. The second grid 212 of the thyratron is grounded as is the cathode 214. The center arm 216 of the relay 156 connects through a resistor 218 and capacitor 220 by the lead 222 to the terminals H and K of the plug 98. Note that the lead 224 extends to a connection between the terminal 27 of the plug 52 to these terminals H and K also. The terminal H provides positive potential (B+) to the clutch 56 and brake 58, and the terminal K provides the same positive potential (B+) for a pre-set switch (see 313, FIG. 5) located at the shutter for manual operation of the shutter.

The output of the thyratron 196 is applied through resistor 226 in lead 228 to the terminal I which is the clutch voltage terminal. Note that the plate 194 of the thyratron 196 is also connected by way of lead 227 through the solenoid 230 of the relay 156, and also through the series resistor 232 to the B+ lead 222. Center arm 216 connects by lead 234 with the terminal E of the output plug 98, and this applies the energizing voltage to the brake 58.

Another relay 240 is shown which has its solenoid 242 (shunted by series resistance and capacitance to prevent sparking) connected in series with resistor 244 through lead 246 to the B+ lead 224, adapted to be energized by the re-set signal from the programming board 46 through terminal 24 and lead 248. The lower contact 250 of the relay 240 is connected to lead 246, and the arm 252 connects by lead 254 to terminal 25 of the plug 52. This is a reset connection. The grounded solenoid 256 is in circuit with switch 259 and operates relay contacts (not shown). The relay associated with these contacts is a latching relay automatically to shut the printer off at the end of the run. This is done simply by means of a special circuit through the programming board.

As previously stated, the sequence of operation of the parts of the assemblage 42 is of considerable importance. The sequence is graphically illustrated in FIG. 3a which is a chart of function of various components of the circuit of FIG. 3 graphed against time. The solid horizontal lines indicate the periods of time during which the various parts are functioning.

Let us presume, for example, that a cue signal has been given by a notch or perforation of the master film closing an electrical circuit. The shutter pre-set mechanism has previously been set to some position, representing, say a light intensity of 8 and the next intensity set at say 20. As the cue signal is applied to the program board, it energizes the shutter blade release solenoid 62 through the terminal 26 of the input junction block and connector 52 by way of the lead 260 which connects with the terminal J of the output junction block and connector 98. There is a manual switch or button 313 on the assemblage 42 by means of which this same function can be accomplished. When the cue signal has been completed, and the relay in the programming board which has been operated thereby has relaxed, and not until then, the circuit from the bleeder 70 is completed through the particular rotary switch of the programming board which is now connected in the circuit. Since this switch has been set at 20, the voltage which is picked off the bleeder 70 is that which exists at the slider of the potentiometer $P_{20}$. The voltages of the bleeder is applied through the common lead 53 of the programming board 46, the terminal 28 of the input plug 52, and lead 112 to the left hand terminal 110 of the bridge 108. Since the position of the previous setting of the shutter was for intensity 8, the voltage which is applied to the right hand terminal 106 of the bridge 108 is that picked off by the slider of the potentiometer 60, and the result will be an unequal voltage applied to the opposite terminals of the bridge.

Since this occurs substantially instantaneously, the time of unbalance causing the polarized relay 134 to swing in one direction or the other due to flow of current through the solenoid 124 may be neglected. The energizing of the polarized relay 134 is therefore considered as occurring at the time $t_1$. It may also be assumed that the arm 128 will move as shown in FIG. 3 to close the circuit between the lead 126 and contact 132. This closes the circuit through the solenoid 162 of relay 164 by way of the arm 158, contact 160 of relay 156, and the lead 166. These latter contacts of the relay 156 are normally in engagement. When this occurs, arm 202 of relay 164 is drawn from its normally engaged contact 204 (which had been applying a negative potential to the grid 198 of the thyratron 196 keeping it in cut-off condition) and moved to contact 208 thus applying a positive potential on the grid 198 of the thyratron 196 through the lead 200 from the terminal 154 of the power supply 140, causing the thyratron to fire.

The elapsed time from $t_1$ to $t_2$ in FIG. 3a is the inertial time for the relay 164 to operate, and it is of the order of 6 milliseconds.

It will be noted that the above sequence occurs regardless of which direction the unbalance of the relay 134 occurs. Herein lies the rectifying nature of the bridge 108. This bridge has no alternating current applied hereto since, as elsewhere explained, alternating current supplied to the control circuit is rectified at terminals 86, 92. At the same time, regardless of the direction of unbalance, a negative potential is being applied to the grid 179 of the thyratron 180 from the terminal 119 of the bridge 108 thereby keeping this thyratron in cut-off condition for all time that there is an unbalance.

With the application of positive potential to the thyratron 196, the thyratron fires and full current flows in its plate circuit by way of plate 194, solenoid 230 and resistor 232, to its B supply by lead 224. Firing of this thyratron 196 occurs at the time $t_2$ in chart of FIG. 3a, and as soon as this occurs the arm 158 is pulled from contact 160 onto contact 168. The thyratron 196 continues to pass full current, due to the characteristics of such gas-filled tubes, and the potential of the lead 126 is now applied to the motor through the lead 170 by way of the terminal D of the output junction block and connector 98. The motor commences to rotate in the direction which is determined by the polarity of the voltage chosen by the polarized relay 134. The time period from $t_2$ to $t_3$ is the time required for the relay 156 to close the contacts to the motor 54. This is of the order of 10 milliseconds. The motor 54 is thus shown to commence its rotation at time $t_3$. The thyratron 196 also causes flow of current directly to the clutch 56 by way of the lead 228 and the terminal I through the resistor 226, but without delay, hence it may be taken that the clutch 56 is energized just prior to the rotation of the motor 54 commences, namely at the time $t_2$, the motor being energized at time $t_3$.

The above discussed connections of the potentiometer 60, brake 58, clutch 56, and motor 54 to the control unit of the invention are shown diagrammatically in FIG. 3. The several connections are made, as shown by way of conductors included among the multiple conductors of lead 96, to junction block and connector 98.

The situation as thus far described obtains from the time $t_3$ to the time $t_4$ which may be a period of several hundred milliseconds. The motor 54, clutch 56, relay 134, relay 164, and the relay 156 remain energized so long as the unbalance exists in the bridge 108 and across the terminals 110 and 106.

Note that when the relay 156 is energized, it closes the circuit from the plate 186 of the thyratron 180 by the lead 188 through the contact 190 arm 216 and lead 234 to the terminal E of the plug 98 which extends to the electric brake 58. This circuit is inoperative, however, because so long as there is an unbalance, there is a negative potential on the grid 179 of the thyratron 180 and it cannot conduct. The circuit is prepared however for a speedy action the moment that the thyratron does fire.

Gradually the potential picked off the potentiometer 60 by its slider approaches the potential of the slider of potentiometer $P_{20}$ of the bleeder 70 while driving the presetting mechanism of the shutter to the condition of light intensity 20. As soon as his condition occurs, the bridge 108 is in balance. The potential on the grid 179 of thyratron 180 becomes zero and thyratron 180 fires at the time $t_4$ immediately applying the brake 58 through the already established circuit above-described. The firing of the thyratron 180 drops the potential of plate 194 of the thyratron 196 through the capacitive coupling 192, and this lowering the potential of the plate 194 below that of the grid 198 momentarily is sufficient to extinguish the flow of current of the thyratron 196, which immediately de-clutches the motor 54 from the camshaft through lead 228, and relaxes the relay 156.

The balancing of the bridge 108 moved the relay 134 to neutral position, cutting off the current to the motor 54 which may thus be taken as de-energized at time $t_4$. The circuit constants of the relay 156 are such that it takes approximately 25 to 30 milliseconds before it throw is completed, and this time is that within which the brake is engaged to prevent rotation of the camshaft. The relay 156 is completely relaxed at time $t_5$ and this re-establishes the normal conditions of the relay contacts. These include the brake circuit being open and the plate circuit of the thyratron 180 also being open. This latter condition extinguishes the thyratron, and the entire circuit is now ready for the next cycle of operation.

In the meantime, the extinguishment of the thyratron 196 at time $t_4$ has rendered ineffectual the connection of the contact 208 and the arm 202 and the solenoid 162 of relay 164 eventually is de-energized at time $t_5$ after the delay of relaxation of the relay 156. It is thus also ready for the next cycle of operation. Note that the brake is only energized if the clutch is de-energized.

Summarizing the cycle of operation by reference to FIG. 3, the blade release solenoid 62 is energized with the cue signal and the shutter moves to a previously set position. This is done by a circuit including the conductor 260. Thereafter the voltage from the bleeder 70 and the voltage from the potentiometer 60 are applied to opposite terminals of the bridge 103, the connections being indicated generally in the block diagram by the lines 112 and 105. The polarized relay 134 now reflects the unbalance through connections from terminals 110 and 106. Relay 164 is next energized through contacts of relay 156 along path identified by conductors 126 and 166. Thyratron 196 now fires through connection 200 and this energizes clutch 56 through connection 228 while energizing the relay 156 through connection 227. As soon as the relay 156 has completed its throw it energizes the motor 54 through connection 170 and establishes a circuit to the brake 58 by way of the lead 219, but this does not energize the brake because the negative potential applied to the thyratron 180 by the conductor 176 keeps it extinguished. As soon as balanced condition is reached, at time $t_4$, thyratron 180 fires, extinguishes thyratron 196 through the condenser 192, causes motor and clutch to be de-energized at time $t_4$ because of opening of relay 134, applies brake 58 through conductor 188 and relay 156, and when the relay 156 is fully relaxed, becomes extinguished, de-energizing the brake and relay 164.

The above discussion has not considered certain parts of the assemblage 42 which are deemed of substantial importance to this invention. These are illustrated in considerable detail in FIGS. 4 to 6 inclusive, and the details of operation of the shutter blade itself are explained in connection with FIGS. 7 to 11 inclusive.

The various parts heretofore identified in FIGS. 1 to 3 inclusive carry the same reference characters.

The actual controlling device which positions the shutter blade 40 is a contoured cam 261, the radial distance from whose axis varies generally according to the intensity of light to be permitted to pass the blade 40. The mechanism which transforms the rotational aspect of the cam 261 into proper relation of the presetting mechanism to accomplish the positioning of the shutter blade will be for the present passed, and in effect, the portion of the assemblage 42 to the right of the cam 261, as viewed in the figures, will first be explained.

The cam 261 is secured to a hub 262 which is mounted securely to the camshaft 263 by a set screw or the like. The left hand end of the shaft is journalled in the bearing 266 which is set into the member heretofore termed a detent cup 64. The detent cup 64 is cylindrical in external configuration and is mounted in a split plate 267 which is provided with a circular recess 268 to receive the same. A suitable clamping screw 269 may be taken up to contract the recess 268 to hold the detent cup 64. The lateral extension 270 of the recess 268 is to permit a portion of the cam 261 to pass through the plate 267 without interference so that the portion of the assemblage 42 to the right of the plate 267, including the cam 261, may be pre-assembled before mounting in the plate 267.

The camshaft 263 has a collar 272 mounted thereon by means of a set screw or the like, said collar being disposed on the interior of the detent cup 64. Said detent cup 64 is cup-shaped, providing an interior annular recess 273 within which a resilient arm 274 mounted on the collar 272 is adapted to rotate. The arm has a ball seat 275 at its end within which there is disposed a hardened steel ball 276. The bottom of the cup 64 is provided with radial grooves 277 which are adapted to cooperate with the ball 276 in detent fashion, to perfectly position the camshaft 263 and hence the cam 261 when a certain rotational aspect is reached. The system is capable of achieving a high degree of accuracy in placement of the cam, but the addition of the detent mechanism renders the system even more accurate.

The detent cup 64 has the housing 278 of the potentiometer secured coaxially therewith by means of the C-clamp 279 engaging in suitable annular grooves provided in each of the detent cup 64 and housing 278; the housing 278 has the housing 280 of the electric brake 58 secured thereto by means of a similar C-clamp 281 engaging annular grooves provided in the respective parts; the housing 280 has the housing 283 of the electric clutch 56 coaxially secured thereto by means of a similar C-clamp 284 engaging annular grooves. Each of the housings 278, 280, 283 and the exterior surface of the detent cup 64 has the same diameter, so that the resulting assemblage is in the form of an elongate cylinder of substantially uniform diameter. The housing 283 has an elongate sleeve-like end extension 285 which is partially split as at 286, the resulting bifurcation adapted to be drawn together by suitable screws or bolts 287 whereby to engage the housing 288 of the gear box 66 of the motor 54. The unitary motor and gear box assemblage is inserted into the end of the extension 285 and clamped in place.

The motor shaft 289 carries a blade 290 which is axially engaged in a groove 292 provided in the stem 293 of the clutch rotor 294. The clutch rotor 294 is of any suitable construction such as shown, in which there is a ferromagnetic annular ring 295 separated from the stem and body of the rotor by a spacer 296 of some non-magnetic material such as an abrasive cement. The annular coil 297 when energized establishes a magnetic field axially to the left of the rotor 294 as viewed in FIG. 6, and thus seizes the annular ring 297 of ferromagnetic material and draws the same axially toward itself to complete the magnetic circuit across the non-magnetic spacer 296 between rotor 294 and ring 295. Since the ring 297 is splined to a hub 299 that is fixed to the camshaft 263 by any suitable means such as a set screw or pin, the energization of the clutch winding 297 with couple the motor 54 to the camshaft 263 by any suitable means such as a set screw or pin, the energization of the clutch winding 297 will couple the motor 54 to the camshaft 263.

The brake 58 operates in substantially the same way that the clutch operates, except that the winding 300 operates in conjunction with an annular member 301 that is constructed like the rotor 294 but has no stem, and which is fixed to the interior of the housing 280 by suitable set screws such as shown at 302. When the member 301 attracts its ring 303, also splined to the hub 299, the camshaft 263 will be prevented from rotating. The two rings 297 and 303 are separated by a corrugated spring 305 to keep the magnetic circuits apart and enable independent operation of clutch and brake.

The potentiometer 60 has a rotor 306 which has one slider engaging a slip ring 307 and one slider engaging a resistance ring 308. The electrical connections of such a potentiometer are obvious.

Obviously electrical connections extend to the various electrical components of the assemblage just described, and hence electrical terminals are illustrated in FIG. 4 but not given reference characters. The motor 54 and potentiometer 60 require three connections each, and the brake and clutch each require two connections. The electrical connections conveniently extend to the multiple connection plugs 310 and 311 mounted on the arm 312 which also carries the pre-set push button switch 313 for manual operation of the shutter.

The invention as described herein comprises several different phases, and the phase which is to be described in detail hereinafter is a portion of the system which is capable of being considered independently. It is based upon a structure which enables the position of the shutter blade 40 to be pre-set without moving the shutter itself, so that when the scene whose lighting is represented by the pre-set condition arrives at the iris 28, the mere closing of an electrical circuit effects substantially instantaneous movement of the shutter blade 40 to the new position.

As explained in connection with the control circuit, this same signal, or the completion thereof starts the apparatus upon the cycle of pre-setting the linkages and mechanical connections to the next condition of the shutter. This latter cycle will usually take a considerably longer time than the time occupied in the quick movement of the shutter, and obviously such quick shutter movement is essential for high speed printing.

The camshaft 263 has as its ultimate purpose the rotation of the cam 261 to a particular radial disposition representing a position of the shutter blade. Thus, if such rotation of the cam 261 can be accomplished by some other rotating shaft and drive-mechanism other than that described, satisfactory results will nevertheless be achieved through the use of the shutter pre-setting mechanism described hereinafter. This mechanism is illustrated in FIGS. 5, 7, 8, 9, 10 and 11 and that portion of FIG. 6 to the left of the cam 261.

The assemblage of detent cup 64, potentiometer 60, brake 58, clutch 56, and motor 54 is assembled as a substantially elongate cylindrical unitary structure and supported by means of the split plate 267 in the recess 268 thereof. This split plate is arcuate in configuration and of substantial thickness to provide a relatively sturdy support. Said plate 267 is secured to a circular plate 320 by means of a pair of spacers or posts 322 held in place by bolts 324 engaging through the plate 267, cylindrical recesses in the posts 322 and threaded into the right hand face of the plate 320 as viewed in FIG. 6.

The top edge of the plate 320 is flattened at 326 to seat the arm 312 which is suitably secured by fastening means such as machine screws 328. The edge of the plate 320 is rabbeted as at 330 to enable a cylindrical housing 332 (FIG. 2) to be secured thereto by any suitable means, to retain the same dust-tight. The left hand side of the plate 320, which can be referred to as the exterior face, has an integral cylindrical hub 332 which extends substantially outward therefrom, and a cylindrical ring 334 split along its length at the bottom thereof at 336 is clamped thereto by means of the screws 338. Approximately the upper half of the ring 334 extends forward of the end of the hub 332 at 340 and there is a substantially keystone-shaped blade guide plate 342 secured on the end thereof. An arcuate recess 344 coincides with the bore of the ring 334 to clear the blade mount 346 which is also split and secured to the left hand end of the shaft 348 by clamping, using the screw 350. The hub 332 is hollow and ball bearings 354 and 355 are disposed at the opposite ends thereof. The right hand end of the shaft 348 is enlarged providing a hub 356 and a brake disc 358 integral with the shaft 348 and overlying the inner face of the circular disc 320.

The blade 40 is arcuate in cross section, the curvature lying on the circumference of a cylinder whose axis is coincident with that of the shaft 348, and the blade extends axially outward of the blade guide plate 342. Said blade is integral with a radial arm 360 at its right hand end as viewed in FIGS. 5 and 6 which is secured to the blade mount 346 by suitable screws 362. A stiff arcuate member 364 is secured to the upper end of the guide plate 342 spaced therefrom a sufficient amount to permit free arcuate movement of the blade arm 360, and confining the arcuate movement of said arm between its extremities because of the spacers 366 supporting the member 364. A flat arcuate leaf spring 368 engages against the blade arm 360 to prevent wear of the arm 360 to result in looseness of the blade. Obviously if the extent of confined movement of the arm 360 is not sufficient for the purposes of the apparatus, the width of the arm 360 may be decreased or the width of the guide plate 342 increased.

The cam 261 has not been described in great detail since the contours thereof will vary with the design of the structure. In the structure shown and described, the contours are perhaps best shown in FIG. 9 which is a sectional view taken through the assemblage 42 on a plane just to the right of the plate 267 of FIG. 6, but with the detent cup 64 not shown. The view of the cam 261 is thus through the recess 268 of the plate 267 and practically all of the cam 261 can be seen except for the part 370 which forms one arcuate stop end 371 of the cam edge. The other stop end is at 372. The general contour of the cam edge is spiral so that the rotation of the cam 261 will result in a changing throw of the follower, which increases or decreases with the rotation.

Figure 9:
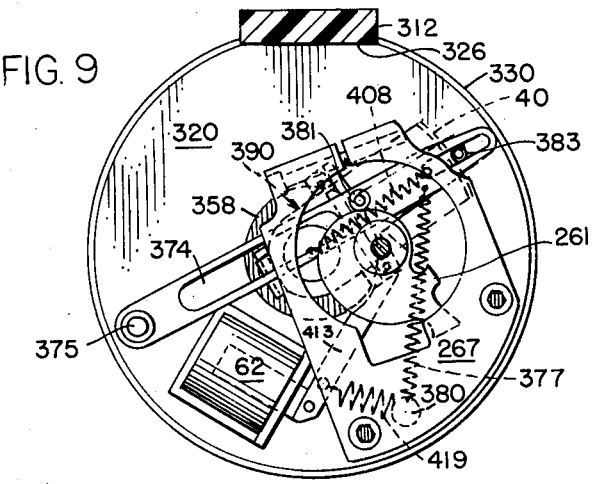
FIGS. 9, 10 and 11 are similar views, comprising rear elevational views of the shutter operating mechanism showing the relationship between the parts for achieving three different positions of the shutter.

The cam follower link 374 is an elongate member which is slightly less in length than the diameter of the plate 320. It is pivoted at 375 on the upper end of a post 376 mounted on the inner face of the plate 320. It is urged in a clockwise direction about its pivot 375 as viewed in FIG. 8 by means of a spring 377 one end of which is secured to the link at 378, a point which is adjacent its free end 379, the other end of the spring 377 being secured to a post 380 mounted in the end plate 320 adjacent one of the spacers 322. About one-third of the way from its free end 379 the link 374 mounts the cam follower 381 which is in the form of a roller mounted on ball bearings. As seen in FIG. 9, the follower 381 will be moved in an arc about the pivot point 375 with rotation of the cam 261. This will swing the link 374.

The free end 379 of the link 374 has an elongate slot 382 in which there is disposed a roller 383 mounted on the end of the arm 385 of a T-shaped member 386 which is part of an assemblage 390 referred to hereinafter as a double hinge.

The double hinge 390 is formed of three parts, one of which is a member 392, the second of which is the link 394, and the third of which is the T-shaped member mentioned above. The member 392 includes a split sleeve part 395 clamped to the hub 356 by the screw 396, having an integral rectilinear portion 397, which forms one of the leaves of the double hinge. This rectilinear portion 397 at its right hand end (FIG. 8) has a socket or ear 399 which carries the hinge pin 400, the axis of which lies substantially on the plane of the edge of the rectilinear portion 397. The link 394 lies parallel with the portion 397 and at its right hand end has an ear 401 which includes a portion offset toward the portion 397 and of lesser thickness than the body of the link 394, so as to lie beneath the ear 399, and perforated to receive the hinge pin 400 also. The opposite, that is, left hand end of the link 394 is similarly formed, but the offset ear 402 extends in the opposite direction, and has a perforation lying on the plane of the bottom edge of the link 394. The T-shaped member 386 includes a cross bar portion 403 integral with the elongate center arm 385 which lies parallel with the link 394, has an ear 404 at its left hand end, and has a second hinge pin 405 pivotally securing said ear to the link 394.

Figure 10:
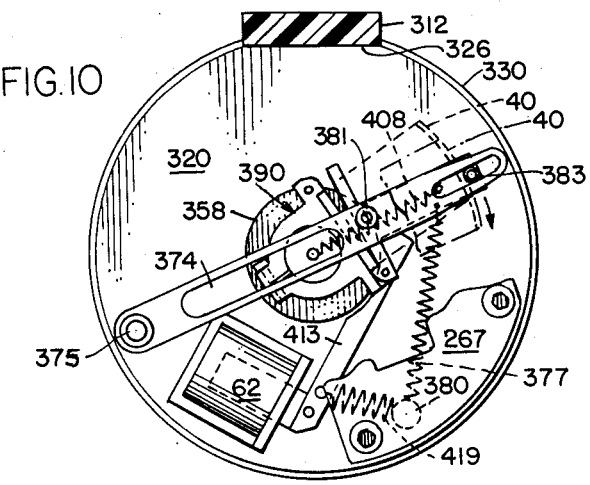
Figure 11:
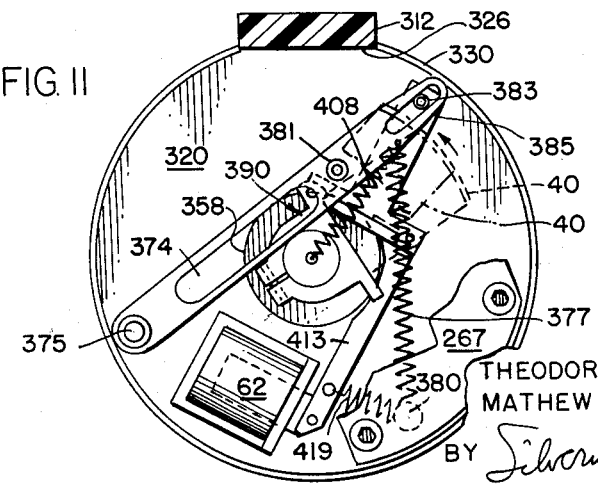

As shown by the broken lines of FIG. 8, and by the views of FIGS. 9, 10 and 11, the double hinge 390 can open to both sides of center. Looking at FIG. 8, if the arm 385 swings to the right as indicated at 385', cross bar portion 403 and the link 394 will remain engaged and together swing around the hinge pin 400. If the arm 385 swings to the left, as indicated at 385", the link 394 and the rectilinear portion 397 will remain engaged and only the cross bar portion 403 will swing around the hinge pin 405.

The end of the arm 385, in addition to the roller 383 also carries a peg or pin 406, and between this pin 406 and a similar pin 407 which is provided on the hub 356 at its center, there extends a helical spring 408 which exerts a tension on the T-shaped member 386 tending to bias the same toward the axis of the hub 356 at all times. This, of course, applies a constant force between the outer two parts of the double hinge 390 always trying to close the parts of the hinge. If the T-shaped member 386 of the hinge 390 has been moved to one side or the other and remains in that position, the force in trying to bring the parts of the hinge together will also apply a component of force substantially at right angle to the line between the pin 406 and the center of the hub 356, and this force is a vector whose direction is substantially tangential to the hub 356, either one way or the other. This vector also generally bisects the angle between the two open leaves of the double hinge. The force will therefore tend to rotate the hub one way or the other in an attempt to bring the three leaves of the double hinge together, and simultaneously there will be a swinging of the T-shaped member 386 in a direction to bring its cross bar portion 403 to a position precisely normal to the axis of the helical spring 408 which is a stable position which comprises a radial line extending from the center of the hub 356 to the peg or pin 406. Obviously, in this movement, the roller 383 will move along the slot 382. This movement, namely, the rotation of the hub and jack-knifing movement of the T-shaped member 386 to close the leaves of the double hinge will occur only if the parts are disposed to permit such movement. This is normally prevented by means braking rotation of the hub as will be described, so that after movement of the cam, the parts will remain in poised or pre-set condition. When released, the speed of rotation of the hub, and hence the movement of the shutter blade 40 depends upon the tension of the spring 408, the inertia of those parts which are required to move, and the friction of the moving parts and their shaft and pins.

Suitably balanced and mounted on bearings as shown at 354 and 355, the hub 356 and shaft 348 can be rotated almost instantaneously for the few degrees required, from a position in which the T-shaped member is moved one side or the other of a given center position.

It is important to understand that when the T-shaped member has been disposed in a given position, the release of the hub 356 will result in the double hinge 390 and its T-shaped member 386 assuming a new position which is completely stable. Thereafter, the movement of the T-shaped member to another position and subsequent release of hub 356 will be followed by the movement of the double hinge and hub 356 to a new stable position, and so on. Double hinge 390 may be considered a hinged link.

It should be seen that the rotation of the cam 261 is that which causes the swinging of the link 374, the swinging of the link 374 carries the roller 383 with it, the movement of the roller 383 applied to the T-shaped member would rock the link comprising the double hinge 390 directly to rotate hub 356 if the hub 356 is not restrained. Since this situation does not obtain when cam 261 is being moved, the hub being braked, T-shaped member 386 is rocked one side or the other off part 392 to produce the force vector mentioned. Since the hub 356 is not permitted to rotate, the force tending to bring the parts of the double hinge 390 together and change the position of shutter blade 40 will be stored in the spring 408, and whenever the hub 356 is released, the new position of the shaft 348 will immediately be assumed. The disposition of the shutter 40 can thus be pre-set and not permitted to change until any time that is desired. The manner in which this is done will be described next.

In FIG. 7 a braking mechanism has been illustrated without any extraneous details to show clearly how the pre-set structure is held against movement, and permitted to move whenever desired. The braking disc 358 is integral with the hub 356. A block 410 which is screwed to the rear surface of the plate 320 has an undercut portion 411 within which the end 412 of the brake arm 413 is adapted to rock. The brake arm 413 is pivoted on a pin 414 carried by the block 410 and has a pressure edge 415 which is adapted to press the leaf spring 416 mounted on the block 410 against the edge of the brake disc 358. The spring 416 serves as a brake shoe. The mechanical amplification of the brake arm 413 is quite substantial since the distance from the pivot 414 to the pressure edge 415 is a small fraction of the distance from said pivot point to the pin 418 at which point a helical coiled spring 419 applies a force tending to cause the pressure edge 415 to press against the edge of brake disc 358. The spring 419 extends between the pin 418 and the post 380 to which, it will be recalled, the end of the spring 377 is also secured.

A bracket 420 secured to the plate 320 mounts the solenoid 62 whose movable core 421 is bifurcated at 422, straddles a pin 423 in the end of the brake arm 413 and is prevented from being drawn past the pin 423 by a cross pin 424 extending between the halves of the bifurcation. Applying current to the solenoid 62 will pull the arm 413 against the force of the spring 419, relieving the pressure of the end 412 against the brake disc 358. If the pre-set linkage has in the meantime been adjusted to a position which would tend to rotate the hub 356, mere application of current to the solenoid 62 releases the disc 358 and permits rotation of the shaft 348.

FIGS. 9, 10 and 11 illustrate the disposition of the parts of the pre-setting mechanism and the shutter for three different conditions. The cam 261 is shown only in FIG. 9 which is a condition of quiescence, that is to say, it is a condition in which the linkage or mechanism has not been pre-set or loaded to cause movement of the shutter blade 40. The shutter blade 40 shown in broken lines can be seen aligned approximately with the upper right hand end of the cam follower link 374. The double hinge 390 is shown completely closed and hence the T-shaped member is aligned with a radius through the center of the hub 356. If the brake arm 413 were rocked by the action of the solenoid 62, nothing would occur to the shutter blade 40. Note that the cam follower 381 is located in the approximate center of the circumferential cam surface of the cam 261.

In FIG. 10, the cam 261 is not illustrated to keep the view uncluttered, but it has been rotated in a counterclockwise direction approximately to the end of its cam edge. This has brought the roller 381 into the stop end which is closest to the axis of rotation of the cam. The link or arm 374 has therefore been urged to follow the cam surface in its decreasing diameter spiral by reason of the spring 377. The arm 374 will therefore swing in a clockwise direction a slight amount about its pivot 375. The initial position of the double hinge 390 has been assumed to be the same as that of FIG. 9. The slight movement of the arm 374 is multiplied when this movement is transmitted to the end of the T-shaped member 386, and hence this member will rotate on the bottom pivot of its cross bar, opening only the outer leaf of the double hinge as shown. Now when the solenoid 62 is energized, the T-shaped member 386 will rotate about the hinge pin counter-clockwise, while the hub 356 and the remainder of the double hinge 390 rotate about the hub axis to close the double hinge. This will carry the hinge blade 40 to a new position shown, displaced from its position in FIG. 9 in a clockwise direction.

In FIG. 11, the same initial position as FIG. 9 is again presumed, but in this case, the cam 261 has been rotated in a clockwise direction to its opposite extreme, and the link 374 has been raised, swinging the same slightly counter-clockwise about its pivot 375 relative to its position in FIG. 9. The double hinge 390 now opens in the opposite direction from that of FIG. 10, the two outer leaves swinging together, and when the solenoid 62 is energized, the closing of the hinge will bring the shutter blade 40 to a new position displaced relative the position of FIG. 9 in a counter-clockwise direction.

Obviously the shutter is capable of being moved from the position of FIG. 10 to that of FIG. 11 and vice versa, these being approximately the extremes of positions of the shutter blade. In the commercial device constructed according to the invention, this maximum movement of the shutter blade occupied a time of approximately 3 milliseconds. Since the changes which are made from scene to scene in printing film are predominantly less than from extreme of light to complete absence of light, the time occupied by the moving shutter will almost always be less than 3 milliseconds. Considering a speed at which the film can be printed using the invention as approximately 150 feet per minute, the maximum amount of film which passes the shutter blade 40 during movement from extreme to extreme is .09 inch, which is a negligible fraction of a frame. Even for twice that speed, the total film movement is .18 inch. Such speeds of shutter change never before have been attained in the film printing art.

The commercial example also had a dead band of approximately three degrees of rotation, this being the approximate maximum movement of the potentiometer 69 which would not have any effect upon the servo system. This means that the driving system, clutch, and brake lose control of the cam-shaft when the narrow dead band around the final light setting is reached by the cam-shaft. The detent mechanism then takes over movement of the cam-shaft, and the ball falls into the bottom of the groove closest thereto. Since the grooves are approximately 12½ degrees wide, the repeatability of each setting is assured.

The pre-positioning mechanism of the assemblage 42 including both the drive-clutch-brake-cam arrangement and the linkage and mechanism between the cam 261 and the shutter blade 40 have achieved a high degree of efficiency according to the invention, because of the elimination of inertia to the greatest extent possible. The movement of the prepositioning linkage uses the shortest distance between the former position and that to which the same is adjusted. This is accomplished by the double hinge arrangement which enables the cam follower link 374 to swing either side of the double hinge, thereafter to be followed by the return of the hinge and rotation of the shaft carrying the shutter blade.

Because of the speed possible with the invention, it is possible to have shorter scenes, adequately and perfectly printed, completely automatically at speeds far exceeding any speeds which have utilized apparatus heretofore known.

The many advantages which flow from the invention and all of the phases thereof should by now be quite apparent to those skilled in this art, and many attributes not specifically mentioned will be manifest from the above description. Further description is believed unnecessary since an effort has been made to be as complete as possible in the disclosure of all those details and principles of operation needed in order to afford a complete understanding of the invention and all parts thereof. It is desired to point out what should also be obvious, namely— that considerable variation in the sizes, proportions, shapes, and many of the details of the invention, as well as in the electrical circuitry thereof, without in any way departing from the spirit or scope of the invention, or sacrificing any of the advantages thereof. It is therefore desired to emphasize that the invention is intended to encompass a wide range of equivalents all as intended by the patent law, limited only by the language of the appended claims, interpreted in their widest scope commensurate with the prior art relating to this subject matter.

What it is desired to claim is:

1. In a device of the character described, and which includes a rotatable shaft whose position it is desired to control, an electric motor adapted for forward and reverse rotation, an electric clutch which when energized will couple the motor to said shaft, and a potentiometer including a rotatable element coupled to said shaft and adapted to provide a voltage the value of which is related to the radial disposition of said shaft; means for controlling the operation of said motor and clutch to rotate said shaft to a pre-determined position, which comprises: a voltage divider, means for tapping into said divider at a position therealong representing said pre-determined position of said shaft, a rectifying bridge having first and second opposite input terminals connected, respectively, to the voltage of said tap and of said rotatable element applied in balancing opposition thereto, a polarized circuit-establishing device connected across balance terminals of said bridge and energized only when there is an unbalance of voltages respectively applied to said opposite terminals and providing an unbalance current the direction of which depends upon the direction of unbalance, a current make-break device having at least two output paths, one of which is directly to said clutch and the other of which is to said motor and having delayed switch means therein, the polarized circuit-establishing device being connected to initiate operation of said make-break device irrespective of polarity of said unbalance current whereby to activate said output paths, and said circuit-establishing device also being connected to said delayed switch means, whereby when said latter means is activated by said make-break device, said motor will be energized, but only after a delay, to rotate in a direction depending upon the polarization of said current, and only so long as there is an unbalance.

2. A structure as claimed in claim 1 in which said make-break device is a grid-controlled gas tube, said delayed switch means is a relay, and said polarized circuit-establishing device is a polarized relay.

3. In a device of the character described, and which includes a rotatable shaft whose position it is desired to control, an electric motor adapted for forward and reverse rotation, an electric clutch which when energized will couple the motor to the shaft, an electric brake which when energized will prevent rotation of the shaft, and a potentiometer including a rotatable wiper mounted on said shaft and adapted to provide thereat a voltage the value of which is related to the disposition of said shaft; means for controlling the operation of said motor, clutch and brake to rotate said shaft to a predetermined position, which comprises: a voltage divider, means for tapping into said divider at a position therealong representing said pre-determined position of said shaft, a comparison network having the voltage of said tap and of said rotatable element applied in opposition therein and said network having an output circuit and providing a polarized current whose direction and value are related to the difference between said two voltages, circuit-establishing means in said output circuit adapted to be energized only in response to an unbalance between the values of said two voltages for producing a polarized current whose direction is dependent upon the direction of unbalance of the values of said two voltages respectively applied to said opposite terminals, a first current make-break device having at least two output circuits, one circuit being connected directly to said clutch and the other circuit being connected to first electromagnetic switch means, said circuit-establishing means being connected with both said first make-break device and said first electromagnetic switch means whereby to activate said make-break device and cause thereafter energization of said first electromagnetic switch means, said switch means when energized completing a circuit from said circuit-establishing means to said motor, whereby the condition of unbalance will energize said clutch and said motor, and a normally open electrical circuit connected to energize said brake, a second make-break device adapted when activated to close said circuit to energize the brake, means suppressing activation of said make-break device so long as a condition of unbalance of voltages applied to said two terminals exists, but causing activation when a condition of balance of said two voltages exists.

4. A structure as claimed in claim 3 in which said electrical circuit connected to energize said break has a series switch therein connected to be closed when said first electromagnetic switch means is energized, and said first electromagnetic switch means includes delay means, said second make-break device having an extinguishing output connection with said first make-break device whereby to de-activate said first make-break device when said second make-break device is activated, thereby de-energizing said first electromagnetic switch means and permitting said brake to be energized while said delay means still retains said series switch closed.

5. In a structure of the character described, a comparison circuit, an electric brake, an electric motor, an electric clutch, a potentiometer having a rotor, a potentiometer having an adjustable tap, a shaft mounting the rotor and clutch, the brake adapted to be energized to prevent rotation of the shaft, the motor adapted to be coupled to the shaft by energization of the clutch and drive the shaft thereby when said motor is energized, a suppression potential producing network connected with said comparison circuit, the rotor and tap being connected in balance arrangement to said comparison circuit and providing a polarized error current if unbalanced, said network producing a suppression signal only when said current flows therein, a polarized relay and a source of negative and positive current adapted to be connected to said relay when same is unbalanced, the relay being connected to be energized by said error current, a pair of gaseous control tubes, one being connected to be activated by said error signal and the other connected to be suppressed by said suppression signal, a relay having first and second switches and the first tube connected to close said switches, the first switch connecting said polarized relay to said motor and said second switch connecting the output of said second tube to said brake, but said brake not being energized while said second tube is suppressed, the first tube being directly connected to said clutch, said second tube having its output also connected in suppression relation to said first tube, whereby when a condition of balance exists said second tube will no longer be suppressed, but will become activated, suppress the first tube while energizing said brake, and the suppression of the first tube de-energizing said relay and opening said switches so that the brake is energized only for the short time required to de-energize the relay.

6. A structure of the character described for moving a shaft to a pre-determined position, and which comprises, an electric motor, an electric clutch adapted when energized to couple the motor to the shaft, an electric brake adapted when energized to prevent rotation of said shaft, a potentiometer including a slider mounted on said shaft and connected across a source of voltage whereby the voltage at said slider is a function of the shaft position, a voltage divider also across said source and having taps along the length thereof whose voltage varies with position and is a function of the desired position of the shaft, a rectifying bridge having first and second opposite terminals, means for connecting said tap and said slider, respectively, to said first and second terminals, for causing flow of current between said terminals responsive to an unbalance between voltages respectively applied to said terminals in a direction consistent with the sense of said unbalance, and a polarized relay connected in circuit with said terminals for energization by current flow therebetween resulting from unbalance between said applied voltages, a first relay connected to be energized by said polarized relay and a first thyratron having said clutch and a second relay in its output, a motor energizing circuit adapted to be closed by said first relay, the first relay being connected to fire said first thyratron and thereby cause energization of said clutch and motor to rotate the shaft and slider while bringing the voltages applied to the opposite terminal of said bridge to balanced condition, a second thyratron having said brake connected in the output thereof through said second relay, a suppression signal producing device connected with said bridge and adapted to provide a suppression signal to prevent firing of said second thyratron until a balance condition is achieved, the firing of said second thyratron acting to energize said brake, said second thyratron also being connected to extinguish said first thyratron whereby firing of said second thyratron also de-energizes said second relay to de-activate said brake, the brake being thus activated only during the time required for the second relay to respond to said de-energization of said second thyratron.

7. In a device of the character described which comprises a servo system including a shaft adapted to be positioned to represent a pre-determined condition, a motor connected to drive said shaft and an error signal producing circuit to energize the motor including a potentiometer slider driven by said shaft, said system having a zone of no response within which movement of said potentiometer slider will not result in energization of said motor; detent means for accurately positioning said shaft comprising a rotary detent member mounted on said shaft rotating relative to another detent member, one of said detent members having a plurality of radially arranged detent positioning means and the other being of configuration to engage said positioning means, the polar dimension of said zone being substantially less than the polar dimension between detent positions whereby the final position of said shaft will be controlled by the physical engagement of said rotary detent with one of said positioning means.

8. A structure as claimed in claim 7 in which said one of said detent members comprises an annular disc having a plurality of radial grooves on a face thereof and said other of said detent members comprises a ball biased against said face and adapted to engage in said grooves, and the ball and disc being rotatable relative one another on the same axis.

9. In a device of the character described which comprises a servo system including a shaft adapted to be positioned to represent a pre-determined condition, a motor connected to drive the shaft and an error signal producing circuit to energize the motor including a potentiometer slider driven by said shaft and said system having a zone of no response within which movement of said slider will not result in energization of said motor; detent means for accurately positioning said shaft comprising a member having a plurality of radial V-shaped grooves mounted coaxial with said shaft but the shaft being rotative relative thereto, ball means carried by said shaft and resiliently biased against said grooved member to be engaged in said grooves consecutively as said shaft rotates and thereby accurately position said shaft, and the polar dimension between grooves being greater than said dead zone.

10. A structure as claimed in claim 9 in which the grooves are immediately adjacent one another whereby in moving from groove to groove said ball means must ride over a sharp ridge.

11. A presetting arrangement wherein an object is movable to any one of a plurality of positions for exercising a different control function, the improvement comprising a single prepositioning means, a rectifying bridge circuit, a programming means for successively applying distinctive control voltages to said bridge circuit for energizing said single prepositioning means, while said object is performing said function, to move said prepositioning means to any one of a plurality of different positions, and means thereafter controlled by said prepositioning means for moving said object to a respective position corresponding to the last named position of said prepositioning means.

References Cited by the Examiner
UNITED STATES PATENTS

| | | | | |
|---|---|---|---|---|
| 2,715,703 | 8/55 | Schuck | 318—162 |
| 2,840,771 | 6/58 | Kammn | 318—28 |
| 2,917,640 | 12/59 | Batterman et al. | 318—29 X |
| 2,991,762 | 7/62 | Baumback et al. | 318—162 |

JOHN F. COUCH, *Primary Examiner.*

ORIS L. RADAR, MILTON O. HIRSHFIELD,
*Examiners.*